United States Patent
Reichhart

(10) Patent No.: US 8,055,524 B2
(45) Date of Patent: Nov. 8, 2011

(54) METHOD FOR VISUALIZING A PROCESSING STATUS OF AN ORDER

(75) Inventor: Thomas Reichhart, Aldenhoven (DE)

(73) Assignee: Hiflex Software GesMBH, Vienna (AT)

( * ) Notice: Subject to any disclaimer, the term of this patent is extended or adjusted under 35 U.S.C. 154(b) by 465 days.

(21) Appl. No.: 11/722,392

(22) PCT Filed: Dec. 2, 2005

(86) PCT No.: PCT/EP2005/012894

§ 371 (c)(1),
(2), (4) Date: Jun. 21, 2007

(87) PCT Pub. No.: WO2006/066708

PCT Pub. Date: Jun. 29, 2006

(65) Prior Publication Data

US 2009/0265195 A1 Oct. 22, 2009

(30) Foreign Application Priority Data

Dec. 21, 2004 (DE) .......................... 10 2004 062 785

(51) Int. Cl.
*G06F 17/00* (2006.01)
(52) U.S. Cl. ..................................................... 705/7.13
(58) Field of Classification Search ................. 705/7, 26
See application file for complete search history.

(56) References Cited

U.S. PATENT DOCUMENTS

| | | | | |
|---|---|---|---|---|
| 6,535,295 B1 * | 3/2003 | Brossman et al. | ........... | 358/1.15 |
| 7,567,360 B2 * | 7/2009 | Takahashi et al. | ........... | 358/1.15 |
| 7,589,849 B2 * | 9/2009 | Carney et al. | ................ | 358/1.15 |
| 2004/0064351 A1 * | 4/2004 | Mikurak | ........................... | 705/7 |

OTHER PUBLICATIONS

James E. Harvey: "JDF: Where to Begin", 2002.
Don Goldman: "Making the best MIS choice", in: American Printer, Feb. 1, 2003.
Doug Belkofer: Digital smart factory forum 2002, Orlando, Florida, Mar. 6-8, 2002.
KBA-Report 24—Sep. 2004.
JDF Specification CIP4, 2003.
Total Networking. Implementing CIM and end-to-end workflows with JDF, 2004.

* cited by examiner

*Primary Examiner* — Thomas Dixon
(74) *Attorney, Agent, or Firm* — Von Rohrscheidt Patent

(57) ABSTRACT

A method for visualizing a processing status of an order is disclosed, wherein the order is issued by a management information system, and executed on an execution system, and wherein status reports associated with the order are transmitted from the execution system to the management information system in Job Definition Format, and incoming status reports are stored in the management information system. In order to achieve simple handling and administration with a high degree of reliability, and simultaneously, with a high degree of flexibility with respect to changing requirements profiles, it is suggested that the processing status for each visualization is determined from the stored status reports on the fly through a parser.

9 Claims, 4 Drawing Sheets

| Chargeable | To be Charged | Red |
|---|---|---|
| ApprovalRequested | Approval Requested | White |
| ApprovalInProgress | Approval in Progress | Cyan |
| ApprovalNotRequired | No Approval Required | Green |
| WaitingForCorrection | Waiting for Correction | HKS7 |
| Approved | Approved | Green |
| Rejected | Approval Denied | Red |

Fig. 1

| //JMF/Response[@Type="SubmitQueueEntry"] | createJob |
|---|---|
| //JMF/Signal/ResourceInfo/ApprovalSuccess | pageApproval |
| //JMF/Signal/ResourceInfo/ExposedMedia | prepressOperation |
| //JDF | jdf |
| //JMF | other |

Fig. 2

| Ready | Ready |
|---|---|
| Available | Ready |
| Imposition | Imposition |
| Approval | Check |
| Page | Page |
| Sheet | Sheet |
| Roll | Roll |
| Alteration | Change |
| Rework | Change |
| Original | As Requested |
| Completed | Ready |
| NonChargeable | Not to be Charged |

Fig. 3

| Chargeable | To be Charged | Red |
|---|---|---|
| ApprovalRequested | Approval Requested | White |
| ApprovalInProgress | Approval in Progress | Cyan |
| ApprovalNotRequired | No Approval Required | Green |
| WaitingForCorrection | Waiting for Correction | HKS7 |
| Approved | Approved | Green |
| Rejected | Approval Denied | Red |

Fig. 4

| | |
|---|---|
| //jdf:JDF/jdf:JDF[@Type="Approval"] and //jdf:ResourcePool/jdf:RunList[@ID="PAGE_LIST"] and count(//jdf:ExposedMedia) = 0 and count(//jdf:LayoutElement) = 0 | Test OK |
| //jdf:JDF/jdf:JDF[@Type="Approval"] and //jdf:ResourcePool/jdf:RunList[@ID="PAGE_LIST"] and count(//jdf:ExposedMedia) = 0 | Page released |

| Date | /jdf:JMF/@TimeStamp |
|---|---|
| Time | /jdf:JMF/@TimeStamp |
| Type | /jdf:JMF/jdf:Signal/jdf:DeviceInfo/jdf:JobPhase/jdf:JDF/jdf:JDF/@Type |
| Status | /jdf:JMF/jdf:Signal/jdf:DeviceInfo/jdf:JobPhase/jdf:JDF/jdf:JDF/@Status |
| Page | /jdf:JMF/jdf:Signal/jdf:DeviceInfo/jdf:JobPhase/jdf:JDF/jdf:ResourcePool/jdf:RunList/jdf:RunList/jdf:LayoutElement/@DescriptiveName |
| Types(C) | /jdf:JMF/jdf:Signal/jdf:DeviceInfo/jdf:JobPhase/jdf:JDF/jdf:JDF/@Types |
| Status 1 | /jdf:JMF/jdf:Signal/jdf:DeviceInfo/jdf:JobPhase/jdf:JDF/jdf:JDF/@Status |
| Media unit | /jdf:JMF/jdf:Signal/jdf:DeviceInfo/jdf:JobPhase/jdf:JDF/jdf:ResourcePool/jdf:Media/@MediaUnit |
| Media type | /jdf:JMF/jdf:Signal/jdf:DeviceInfo/jdf:JobPhase/jdf:JDF/jdf:Resourcepool/jdf:Media/@UserMediaType |
| Media amount | /jdf:JMF/jdf:Signal/jdf:DeviceInfo/jdf:JobPhase/jdf:JDF/jdf:ResourcePool/jdf:Media/@Amount |
| Media status | /jdf:JMF/jdf:Signal/jdf:DeviceInfo/jdf:JobPhase/jdf:JDF/jdf:ResourcePool/jdf:Media/@Status |

FIG. 5

| ExMedia signature | /jdf:JMF/jdf:Signal/jdf:DeviceInfo/jdf:JobPhase/jdf:JDF/jdf:ResourcePool/jdf:ExposedMedia/jdf:ExposedMedia/jdf:ExposedMedia/@SignatureName |
|---|---|
| ExMedia page | /jdf:JMF/jdf:Signal/jdf:DeviceInfo/jdf:JobPhase/jdf:JDF/jdf:ResourcePool/jdf:ExposedMedia/jdf:ExposedMedia/jdf:ExposedMedia/jdf:ExposedMedia/@SheetName |
| ExMedia side | /jdf:JMF/jdf:Signal/jdf:DeviceInfo/jdf:JobPhase/jdf:JDF/jdf:ResourcePool/jdf:ExposedMedia/jdf:ExposedMedia/jdf:ExposedMedia/jdf:ExposedMedia/@Side |
| ExMedia separation | /jdf:JMF/jdf:Signal/jdf:Deviceinfo/jdf:JobPhase/jdf:JDF/jdf:ResourcePool/jdf:ExposedMedia/jdf:ExposedMedia/jdf:ExposedMedia/jdf:ExposedMedia/jdf:ExposedMedia/@Separation |
| Employee | /jdf:JMF/jdf:Signal/jdf:DeviceInfo/jdf:JobPhase/jdf:JDF/jdf:AuditPool/jdf:PhaseTime/jdf:Employee/@PersonalID |
| MIS cost type | /jdf:JMF/jdf:Signal/jdf:Deviceinfo/jdf:JobPhase/jdf:JDF/jdf:AuditPool/jdf:PhaseTime/jdf:MISDetails/@CostType |
| MIS work type | /jdf:JMF/jdf:Signal/jdf:DeviceInfo/jdf:JobPhase/jdf:JDF/jdf:AuditPool/jdf:PhaseTime/jdf:MISDetails/@WorkType |
| MIS work details | /jdf:JME/jdf:Signal/jdf:DeviceInfo/jdf:JobPhase/jdf:JDF/jdf:AuditPool/jdf:PhaseTime/jdf:MISDetails/@WorkTypeDetails |
| Device | /jdf:JMF/jdf:Signal/jdf:DeviceInfo/@DescriptiveName |
| Media status | /jdf:JMF/jdf:Signal/jdf:DeviceInfo/jdf:Jobphase/jdf:JDF/jdf:ResourcePool/jdf:ExposedMedia/@Status |
| Proof type | /jdf:JMF/jdf:Signal/jdf:DeviceInfo/jdf:JobPhase/jdf:JDE/jdf:ResourcePool/jdf:ExposedMedia/@ProofType |

FIG. 6

METHOD FOR VISUALIZING A PROCESSING STATUS OF AN ORDER

RELATED APPLICATIONS

This application is a §371 national phase filing of PCT/EP2005/012894, filed Dec. 2, 2005, and claims priority to German patent application No. 10 2004 062 785.1 filed on Dec. 21, 2004.

BACKGROUND OF THE INVENTION

The invention relates to a method for visualizing a processing status of an order, wherein the order is issued by a management information system, and executed by an executing system, and wherein order related status reports in Job Definition Format are transmitted to the management information system by the executing system, and incoming status reports are being stored in the management information system.

The Job Definition Format "JDF" (and the Job Messaging Format "JMF" as a subset of JDF) comprises generally known data formats that were developed and are being maintained by the consortium "International Cooperation for the Integration of Processes in Prepress, Press and Postpress" ("CIP4-Consortium"). The development of JDF is based on the objective to standardize the communication between print shop, designer, advertising agency, customer for printed matters, and sub vendors of contractors in the framework of a networked graphic production for all production options and eventualities in a flexible manner and without restrictions.

JDF is based on the extensible markup language "XML", a meta language, which is also generally known and developed by the World Wide Web Consortium for defining document types and, according to the intentions of the CIP4-Consortium, is to serve as a standard data format for describing processes and products, not only in all production areas of a networked print shop, in particular in sales, job costing, and order processing, production planning and control in the regular production, in preproduction, print, print post processing, and shipping, in the cross sectional areas, materials and warehouse management, financial and payroll accounting, controlling, cost accounting, and quality assurance.

Through vertical integration of data, on the one hand of the production process, and on the other hand, of the accounting sectors, JDF shall facilitate a standardized documentation of the relevant target and actual data, and seamless production control. In particular, a JDF order shall only be described once in one form, which all process participants understand, also in external communications with customers and subcontractors and their executing systems in the man-machine and machine-machine communication over all language and platform boundaries.

Contrary to the philosophy of the CIP4-Consortium and the JDF concept based thereon, there are various restrictions and specific differences with reference to the information in real life operations of networked print shops, which the particular process participants need, use, or simply understand. In particular, the visualization of the processing status of an order in a management information system puts substantial requirements on the selection and structuring of the information to be displayed.

For example, the management information system should provide a specific perspective of the processing status in the sense of an ergonomic software design for each workstation, depending on its tasks (e.g. machine control, process control, quality assurance, sales and job accounting), which on the one hand, provides only the required information for these task areas, and on the other hand, all information required for these task areas. Furthermore, this perspective shall display the information in a structured manner, so that they allow an intuitive understanding of the job status and thus, short processing times, and, in particular, fast reactions, in problem situations for the respective employee, also in consideration of his level of training and knowledge.

It is the object of the invention to provide a method as described above, which combines simple handling and administration with high reliability and flexibility, with reference to changing requirements profiles.

SUMMARY OF THE INVENTION

According to the invention, it is being suggested that the processing status for each visualization is determined through a parser from the stored status reports "on the fly". Thus, the method according to the invention does not require interpretation of the status report arriving at the management information system. Through the reduction to storage in the original arriving form, in particular in the form of a JDF/JMF file, the initial effort for managing incoming status reports is minimized.

On the side of the management information system, e.g., a simple proxy server can receive and store JMF-status reports for implementing the method according to the invention, which are transferable through the "HyperText Transfer Protocol" (HTTP)—or via another communication scheme, through which data are transferable from one computer to another.

Since the interpretation of the stored status reports in the framework of the method according to the invention is performed only directly when displaying the processing status, this functionality can be completely decoupled from the reception and storage of the status reports (in the embodiment through the proxy server) on a program level. For the reception of the status reports as for the display of the processing status, only the location of the storage has to be available, and the form of the storage has to be known as an interface definition. Through enabling a modular operating mode, the method according to the invention shows high flexibility, on the one hand, and high reliability on the other hand.

In a preferred embodiment of the method according to the invention, the incoming status reports are divided into categories through a parser, and stored in a manner that is organized accordingly. This way the handling of a large number of incoming status reports is simplified.

When the incoming status reports are stored temporarily at a first storage location, like in a cache, by the module responsible for receiving and storing the status reports, the categorization of the incoming status reports can in turn also be performed as a separate module. In case of a failure of the categorization module, the reception and storage of the status reports is not affected. Also, the display of the processing status remains functional, but possibly displays an obsolete status temporarily.

In a particularly simple implementation of the method according to the invention, the status reports are stored in a monitored area. The incoming status reports can, for example, be stored as JDF/JMF files in one or several hot folders, whose content is monitored for changes in the context of the management information system for activating the next respective processing step of one respective application executing in the background, a so-called disk and execution monitor (in workstation operating systems mostly called a demon and in PC operating systems called a service). The storage of a newly received status report by a proxy server in a cache in such a monitored area can then trigger, e.g., the start of the categorization module, the storage of a categorized status report can trigger a respectively updated visualization.

The storage of the status reports in a data system constitutes a particularly simple implementation of a database structure. Alternatively, also the use of other forms of databases is certainly possible.

In the context of a method according to the invention, a processing status can be visualized by a designation specifically defined for it. On the one hand, the key words used in the context of the status reports by the various known executing systems are not uniform, also in case of an identical meaning, on the other hand also various key words and codes can have the same meaning in the context of an operator specific view. For example, reconfiguration, power outage, maintenance, and shift change can be generally combined under the description "shutdown" for accounting statistics of the utilization of an executing system.

Furthermore, a processing status can only be reached from an operator specific view, when several status reports reach a respective defined value respectively. For example, a partial order can only be filled by production management, when it is completely defined, the intended executing system is ready, and the respective base product is ready and delivered.

In the context of a specific method, an operating status can also be visualized through a color specifically defined for it. In particular, the use of signal colors generally known in another context, e.g., green for "ready" or "released", yellow for "wait for input", red for "stopped", blinking for "critical error", facilitates the intuitive understanding of the processing status.

BRIEF DESCRIPTION OF THE FIGURES

The invention is subsequently described with reference to an embodiment. It is shown in:

FIG. 1 a list of fields and assigned directory names;
FIG. 2 a list of field contents and assigned designators;
FIG. 3 a list of field contents and assigned designators and signal colors;
FIG. 4 a list of XPATH inquiries and associated designators; and
FIGS. 5 and 6 are lists of designators for tables and associated JDF field contents.

DETAILED DESCRIPTION OF PREFERRED EMBODIMENTS

In the context of a management information system in a networked print shop, the processing status of the orders is visualized through a JAVA implemented desktop application on distributed workstations with different UNIX or PC operating systems.

The executing systems connected to the management information system transmit JMF status reports via HTTP to a proxy server, which stores them in a special directory tree on a file server. A module is integrated into the proxy server, which categorizes the incoming status reports based on specified XML fields, according to partial orders and processes, and initiates the storage in specified directories in the directory tree. The fields and the associated directories are specified in a configuration file according to the table in FIG. 1. The module for categorizing the incoming status reports executes the lines of this table one after the other until one of the specified fields is found. When starting the desktop application on a workstation, various directories are read from a central server at a workstation, depending on the task of the respective workstation, and depending on the registered user. If a file is located in a directory, it is checked for specified field contents by a parser, depending on the respective directory and the task. The field contents are configured in the configuration file according to the tables in the FIGS. 2 and 3 in an exemplary manner.

The status reports from a read directory are listed in chronological sequence in the desktop application in a table for the respective partial order or process, wherein for each status report the designator specified for the determined field content, and possibly a specified signal color for the status, is displayed. The designators and signal colors are specified in the configuration file according to the tables in the FIGS. 2 and 3 in an exemplary manner.

In the configuration file, according to the table in FIG. 4, in the XML Path Language ("XPATH", www.w3.org/TR/xpath), conditions are specified in a plurality of XML fields. XPATH and the XML Query Language based thereupon ("XQuery", www.w3.org/TR/xquery) are standard formats for defining inquiries for data in XML format. When one of these conditions is fulfilled, the processing status is shown in the desktop application with the designator shown in the right column of the table.

In the desktop application, the partial orders and processes specified for the task are shown together on one screen, or, if necessary, on several screen pages.

In the configuration file, designators and XML field contents to be shown, are specified according to the tables of FIGS. 5 and 6 for columns of such tables in the desktop application.

When starting the desktop application, background processes are started, which monitor the directories on the server for changes, thus for new incoming status reports. If a new status report is stored in one of the monitored directories by the proxy server, the respective background process triggers the reading of this new status report in the desktop application, and the update of the visualization of the processing status of the respective partial order or process.

By the status reports for the visualization in the desktop application being analyzed "on the fly", the implementation of a special data structure for the processing status in the management information system is not necessary. Through changes of information stored in the tables 1-3, the visualization of the processing status can be adapted in a simple manner, e.g., to a newly connected execution system, or to new requirements with respect to visualization.

What is claimed is:

1. A method for visualizing a process status comprising the steps of:
   issuing an order from a management information system;
   executing the order on an executing system;
   transmitting status reports associated with the order from the executing system to the management information system, each status report having a respective form;
   storing incoming status reports in the management information system without changing the form of the status reports;
   determining a processing status from the status reports stored in the management information system by a parser for displaying the processing status on a screen; and
   displaying the processing status on a screen.

2. The method of claim 1, wherein the status reports are transmitted in Job Definition Format from the executing system to the management information system.

3. The method of claim 1, wherein the incoming status reports are divided into categories by a parser and organized and stored accordingly.

4. The method of claim 3, wherein the incoming status reports are temporary stored at a temporary storage location while the incoming status reports are categorized.

5. The method of claim 1, wherein the status reports are stored in a monitored area.

6. The method of claim 1, wherein the processing status is displayed through a designator defined specifically for it.

7. The method of claim 1, wherein the processing status is displayed by a color defined specifically for it.

8. The method of claim 1, wherein the incoming status reports are not interpreted when arriving at the management information system.

9. The method of claim 1, further comprising interpreting the status reports only when displaying the processing status.

* * * * *